(12) United States Patent
Gerfast

(10) Patent No.: US 8,581,539 B2
(45) Date of Patent: Nov. 12, 2013

(54) EFFICIENT CIRCUIT FOR BRUSHLESS LOW COGGING MACHINE WITH CONGRUENT STATOR

(76) Inventor: Sten R. Gerfast, Mendota Heights, MN (US)

( * ) Notice: Subject to any disclaimer, the term of this patent is extended or adjusted under 35 U.S.C. 154(b) by 487 days.

(21) Appl. No.: 12/660,831

(22) Filed: Mar. 5, 2010

(65) Prior Publication Data

US 2010/0225260 A1    Sep. 9, 2010

Related U.S. Application Data

(63) Continuation-in-part of application No. 11/599,844, filed on Nov. 16, 2006, now abandoned.

(51) Int. Cl.
*H02P 1/46*   (2006.01)

(52) U.S. Cl.
USPC ............... 318/700; 318/400.11; 318/400.17; 318/400.38

(58) Field of Classification Search
USPC ............. 318/700, 400.11, 400.13, 400.17, 318/400.26, 400.38; 310/67 R, 68 R, 152, 310/154.05, 154.37, 156.01, 156.16, 185
See application file for complete search history.

(56) References Cited

U.S. PATENT DOCUMENTS

| | | | | |
|---|---|---|---|---|
| 4,704,567 A * | 11/1987 | Suzuki et al. | ............ | 318/400.41 |
| 6,239,563 B1 * | 5/2001 | Kunz | ......... | 318/400.07 |
| 6,476,526 B1 * | 11/2002 | Hsieh | .......... | 310/68 B |
| 6,819,068 B2 * | 11/2004 | Horng et al. | ............ | 318/400.38 |
| 6,940,238 B2 * | 9/2005 | Gerfast | .......... | 318/400.29 |
| 7,026,739 B2 * | 4/2006 | Okada et al. | .......... | 310/194 |

* cited by examiner

*Primary Examiner* — Bentsu Ro
*Assistant Examiner* — Thai Dinh

(57) ABSTRACT

Simple AC circuitry driving a brush-less motor having a rotor consisting of alternate polarity permanent magnet poles, with the rotor journaled in a stator with a like number of wound poles having only two free ends for energizing. The motor is using only two AC electronic switches for starting and accelerating, and an AC switch to run the motor at synchronous speed. It has higher efficiency than previously known circuits, uses less parts and is less costly.

21 Claims, 3 Drawing Sheets

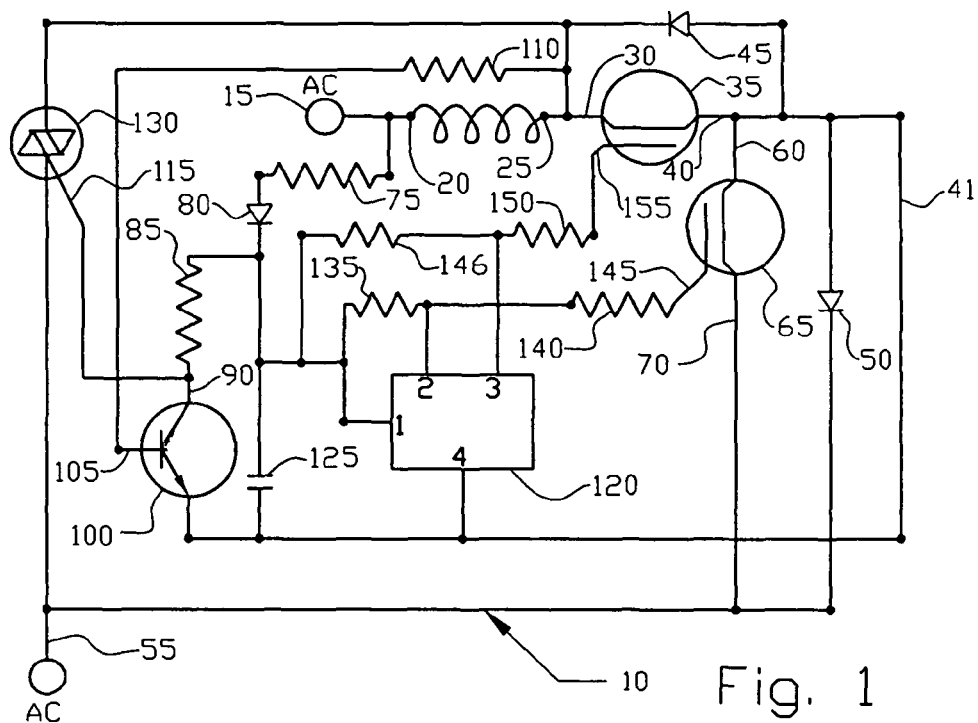
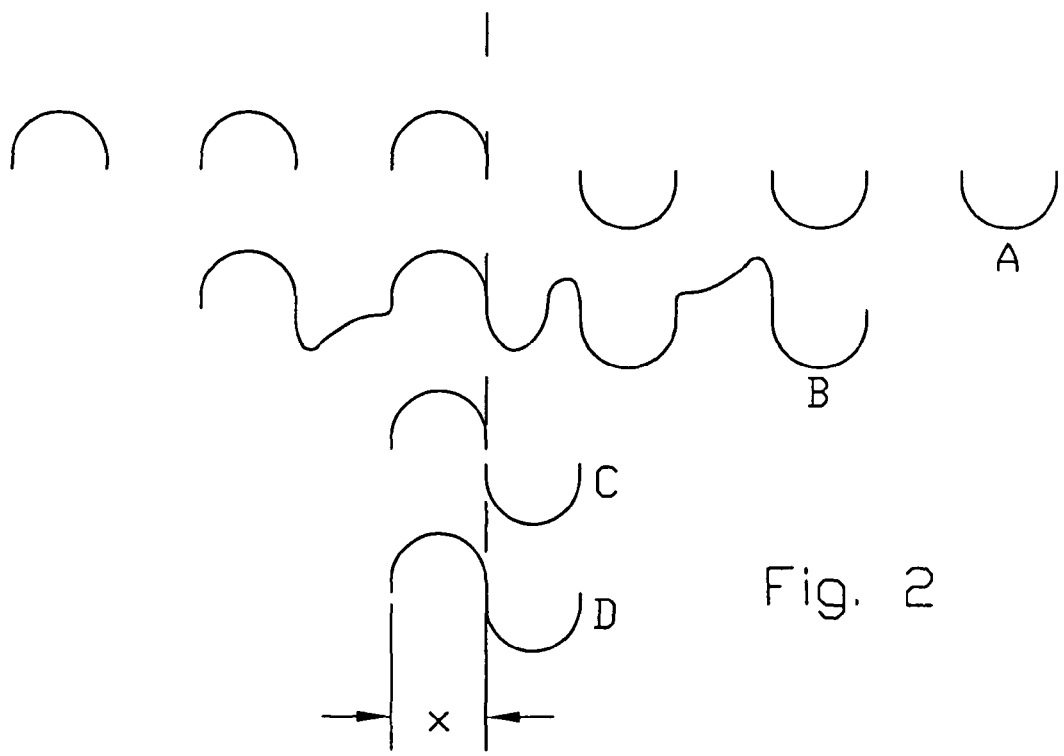
Fig. 1
Fig. 2

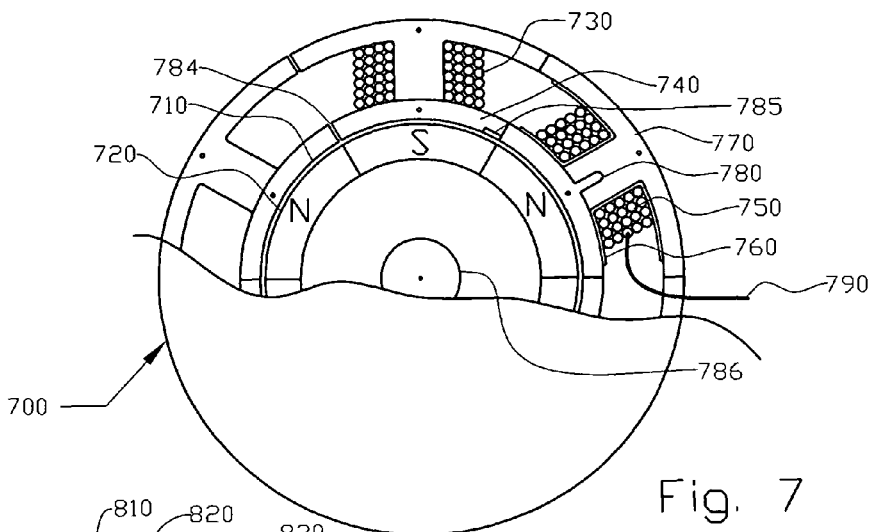
Fig. 7
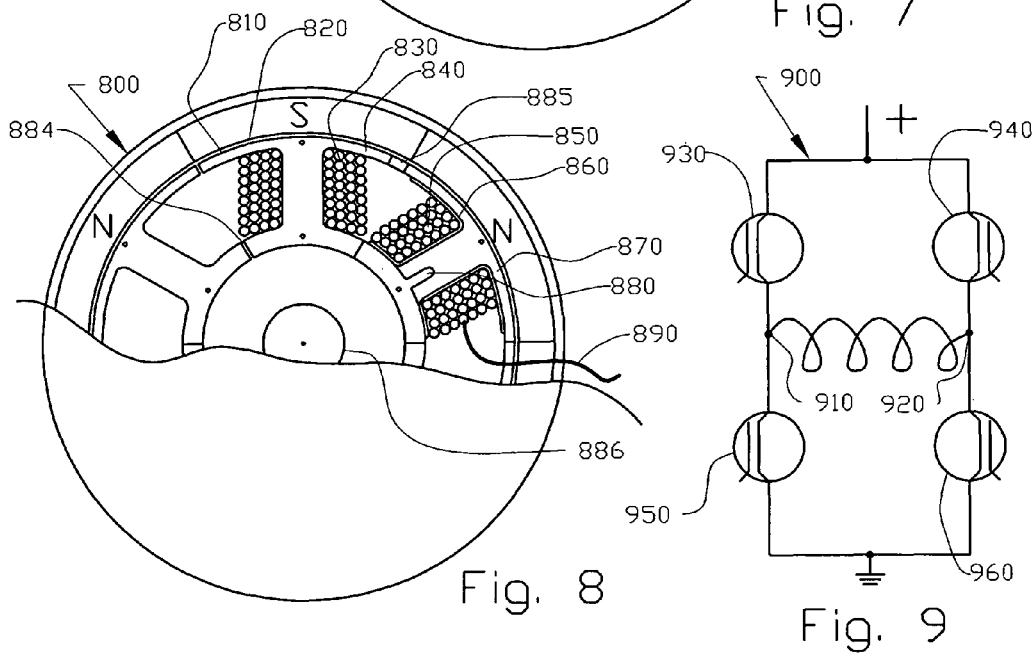
Fig. 8
Fig. 9
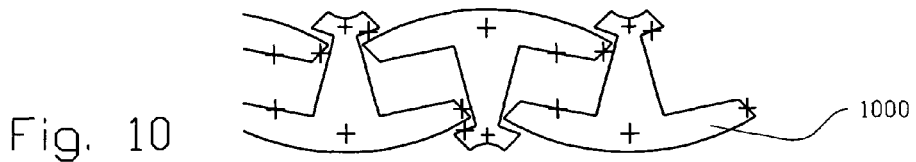
Fig. 10

EFFICIENT CIRCUIT FOR BRUSHLESS LOW COGGING MACHINE WITH CONGRUENT STATOR

CROSSREFERENCE TO RELATED APPLICATION

This is a continuation in part of application Ser. No. 11/599,844 Filed Nov. 16, 2006 now abandoned.

TECHNICAL FIELD

This invention relates to brushless dynamo-electric machines that can be used either as electric generators or electric motors. This C.I.P. solves a cogging problem between the stator and the rotor, that is inherent in most of today's brushless dynamo's with permanent magnet poles and laminated stator poles. The stator has a plurality of mushroom-shaped poles, each with dual wire-wound apertures; a plurality of said poles presenting a congruent periphery of the stator; that is facing the magnets on the rotor. The apertures are pre-wound when the poles are still mechanically apart from each other. After conjoining of the poles into a stator, all said wound windings are connected together and are terminated in two free coil ends for electronic drive simplicity, either when driven by AC or with pulses of DC in a bridge circuit.

This invention also has like number of magnet poles and stator poles for improved motor efficiency, that also is providing a smooth sine-wave AC power output when used as a generator.

DESCRIPTION OF RELATED ART

Almost all the motors and dynamos produced today are of the 3-phase type. The present invention is a non-3-phase machine and is described as a dual phase dynamo. Brushless dynamos and motors are more efficient than other types of dynamos and motors. They are sometimes referred to as BLDC (brushless direct current) and are always containing permanent magnets in the rotor. The magnet-poles are attracting the salient poles of the lamination iron, in the stator, to produce cogging (*A) when starting and running. In the related art, between each salient pole there are normally gaps where the winding needle of a winding machine inserts magnet wire around the pole.

More attraction occurs between a magnet pole and the main area of the salient pole and less attraction at the gaps. This causes the rotor to always line-up with the main area of the pole at start and also causes magnetic reluctance cogging when running. This cogging shows up as an acoustical/mechanical "rumble" and non-uniform instant velocity; that either is accepted, or with some cogging correction needed. The larger the diameter of the required wound magnet wire, the larger the winding gap (* B) is required. A larger gap causes even more cogging. Larger diameter magnet wire is always desired because of the well known fact of "I squared R losses"; a smaller diameter wire has a higher resistance (R) and therefore also has a loss that increases by the square. This loss (* C) is parasitic and results in a dynamo/motor that is running hotter and wastes power.

The insertion of the winding, by the winding machine, through the slot and around the salient pole almost always result in a "scatter wind" that is un-desirable both from a low "copper-fill" (* D) and lower winding induction number. A high copper-fill and high inductance increases efficiency.

Related art motors and dynamo-machine's generally has not addressed the above problems. Increased concerns for efficiency and recent government regulations is driving the development of simpler, yet less costly, dynamo's and motors. Almost all motors and dynamo's that are manufactured today are of the 3-phase design, having three separate windings with three free coil ends. (*E) A 3 phase design has a different number of stator poles versus rotor poles in pairings like 6–8, 12–8 or 6–4, with one term divisible by three, terminating in three free coil ends. These three ends are switched two coils at the time; 1+2 then 2+3 then 3+1. Therefore a 3 phase motor only utilizes approximately two-thirds (66%) of the available copper windings at any one time. Such a configuration can provide a smoother running rotor at the expense of a lower efficiency. It requires costlier drive electronics, necessitating six switching transistors, (* F) three rotor position sensors (*G) (or a more complicated rotor sensing circuit) that is necessary to switch DC to the above mentioned three free ends.

An efficient design, was developed (related art) described in U.S. Pat. Nos. 6,850,019 and 6,940,238 using like number of magnet poles and stator poles, having six or four fairly large winding slots. These slots also resulted in a cogging that had to be counteracted by a resiliently mounted rotor. Both of these patents had internal rotors making it very difficult to achieve high copper-fill, low resistance or to eliminate scatter wind. The stator laminations for these motors could not easily be nested but had to be stamped as a circle from square or rectangular sheets.

Any dynamo/motor having an external rotor needs to have bearings for the rotor shaft that are normally placed inside the stator structure. The external rotor is assembled by inserting the completed rotor shaft into these bearings from one end of the stator. (sometimes referred to as "unit bearing" construction) This construction makes the rotor cantilevered with a chance of vibration or wobble at the un-supported end of the rotor. The present invention can use a similar construction but can also use an additional bearing support on the cantilevered side that is assembled with fasteners after the primary assembly. This achieves a very stable vibration-free rotor.

As an alternate embodiment this invention could be designed as an internal rotor construction that is described in FIG. 7.

In any motor or generator the power produced is at the interface between the rotor and stator; normally called the air gap. The larger the diameter of the position of the air gap, or torque arm, the larger the power that is produced. The low profile external rotor, in the present invention, makes it possible to have the air gap, or torque arm, at a much larger diameter than the internal rotor machines.

If in the present inventions, external rotor embodiment, overall dynamo diameter is assigned as 100 percent, the low profile external rotor diameter is only occupying 25 percent of the total, thereby having a large diameter torque arm.

Most motors or generators made today are of the internal rotor type; an easier constructed machine, but these internal rotor machines would have serious difficulties achieving the low cogging, (or no cogging), or using laminations without winding slots, or achieving the low resistance and the high copper fill and the other benefits of the present invention. Induction motors and generators have in the past been made with external rotors, but the Applicant is un-aware of any brushless, permanent magnet type, non-3 phase designs with an external rotor.

THE PRESENT INVENTION

The present invention retains the Parent Applications major features and Claims (see cover letter Feb. 14, 2010) and also answers the above stated problems: * A External rotor with congruent periphery for less cogging; *B No external/internal winding gaps; (or very small gap) for less cogging. *C Can use larger diameter wire, having low resistance for higher efficiency. *D Higher copper-fill; *E Two free coil ends for simpler drive circuit. *F Four switching transistors; and *G Single sensor. *E. *F and *G achieving lower cost.

The present invention's stator has a plurality of mushroom-shaped poles, each with dual wire-wound apertures, a plurality of said poles presenting a conjoined congruent periphery of the stator; that is facing the magnets on the rotor. This eliminates, or minimizes all the gaps in the stator periphery. The apertures are pre-wound, (alternately wound) when the poles are still mechanically apart from each other. Winding in the apertures can be done without scatter-wind and is also accommodating high copper fill and level-layering of the magnet wires.

The plurality of mushroom-shaped poles can be "nested" (shown in FIG. 10) during the stamping of stator laminations, producing approximately 45 percent saving of lamination material, as compared to the common method of punching out a round stator out of a square piece of material.

A ¾ horsepower machine can have as many as 250 laminations stacked up into the "stator stack" making the 45% saving a substantial cost reduction of the expensive lamination material.

The apertures are pre-wound when the salient poles are still mechanically apart from each other.

After mechanical assembly of the poles into a stator, all said wound windings are connected together in series, parallel or series-parallel, and are terminated in two free coil ends.

A rotor position device is normally attached at the appropriate location on the stator, to signal to an electronic drive circuit when timing and reversal of polarity is correct.

The electronic switches can be mosfets, transistors, igbt's, scr's or triac's.

The increased utilization of both the windings and the magnetic flux is one of the advantages and the increased efficiency of the present invention. Another advantage is the decreased number of electronic switches and the simple inexpensive circuits with less components and its lower parts cost as well as its lower assembly cost.

The term "electronic switches", as mentioned above, can include: transistors, field effect transistors mos-fets (metal oxide semi-conductor field effect transistors), or igbt (gated bi-polar transistor).

The present invention can use the transistors named above as electronic switches, but since AC switching is also used, in addition, the switch types belonging in the thyristor-family like scr and triac's is used Semiconductor manufacturers have been using an array of confusing terms for the three terminals of these devises: Anode, cathode, collector, emitter, M1, M2, gate, base, drain, source.

For simplicity this application will using input terminal, output terminal and gate.

The circuits also uses diodes in addition to the scr's or mosfets. Mosfets contain intrinsic diodes that can substitute for the mentioned diodes. In one circuit the incoming current to the two switches, is regular AC as it appears on regular AC outlets. One of the two switches are connecting "positive half-phases" to the alternately wound coils and the other switch is connecting "negative half-phases" to the same coils a fraction of a second later. With 60 hertz AC used, this time difference would be 8.3 milli-seconds.

After mechanicassembly of the poles into a stator, all said wound windings are connected together either in series, parallel or series-parallel and are terminated in two free coil ends, for efficiency and electronic drive simplicity. Parallel high current connections are possible, which are useful in battery applications.

By eliminating, or having very small gaps, (*B) the cogging is eliminated or minimized.

The dual wire-wound apertures in each salient pole, can be alternately wound, terminated in two free ends (that are the sole connection to circuit), allows for large diameter wires; giving both low resistance (*C) and level-layering high copper-fill (*D).

This invention could be described as:
A drive circuit for a brushless machine, with low cogging, comprising:
a circuit for a brushless machine, with low cogging
having a rotor with permanent magnet poles
journalled in a stator having a like number of poles,
conjoined to have a congruent periphery facing said magnet poles,
with stator poles having alternately wound coils coupled to form a single coil with two free ends,
said two free ends alternately energized with sine wave pulses to start and accelerate said rotor into synchronism with said sine wave, following said synchronism a switch connects said two free ends to AC.

or as a:
A drive circuit for a brushless machine; with low cogging, comprising:
a circuit for a brushless machine, with low cogging
having like numbers of external permanent magnet poles
and mushroom-shaped internal stator poles, each having dual wire-wound rectangular apertures,
with a plurality of said stator poles con-joined
to have a congruent periphery facing said external magnet poles
that are concentrically journalled in close relationship with said stator poles
said wire-windings of all said stator poles connected together
to be terminated into two free coil ends
supplying electric generated smooth sine-wave power when said rotor poles are rotationally driven,
and having a commutated II-bridge energizing said two free coil ends when used as a motor.

or as a:
A drive circuit for a brushless machine, with low cogging, comprising:
a circuit for a brushless machine, with low cogging
having like numbers of internal permanent magnet poles
and mushroom-shaped external stator poles, each having dual wire-wound rectangular apertures,
with a plurality of said stator poles con-joined
to have a congruent internal diameter facing said internal magnet poles
that are concentrically journalled in close relationship with said stator poles
said wire-windings of all said stator poles connected together
to be terminated into two free coil ends
supplying electric generated smooth sine-wave power when said rotor poles are rotationally driven,
and having a commutated H-bridge energizing said two free coil ends when used as a motor.

Brushless motors/generators are characterized as always having permanent magnets on its rotor. When used as a motor the present inventions, is energized through the above mentioned two free ends, either by an AC circuit or being commutated by an H-bridge, that makes for a simple DC energizing of the windings in the rectangular apertures. The H-bridge is both cost effective and simpler with less costly peripheral components. The dual-phase operation starts with its first phase, in that the H-bridge drives the two free ends; number 1 end positive, and number 2 end negative, . . . in the second phase it reverses polarity; number 1 end negative and number 2 end positive . . . and repeats. An H-bridge is shown in FIG. 9. The H-bridge is requiring only 4 transistors instead of six transistors that is required in the 3 phase machine. Only a single rotor position device is necessary to drive the H-bridge at the proper time sequence, as compared to 3 rotor position devices that is required in the 3 phase machine.

Even though the stator coils are "lined-up" with the magnet segments in the present invention, giving excellent starting torque, and very good efficiency, the congruent smooth periphery prevents the reluctance torque cogging that was described above.

The H-bridge drive uses all the copper windings on all the coils (about 100%) at any one time, as can be seen in the above dual phase operation sequence, achieving very high efficiency.

This invention solves the cogging problem, between salient stator poles and north and south poles on the rotor, that is inherent in a brushless dynamo or a brushless motor especially when they are having like numbers of magnet poles and stator poles.

The stators plurality of stator poles are con-joined to have a congruent periphery, facing the magnet poles that are concentrically journalled in close relationship with said stator poles.

As mentioned above, the congruent periphery of the stator has no gaps facing the magnets on the rotor.

The apertures are pre-wound when the poles are still apart.

The stator has a plurality of mushroom-shaped poles, each with dual wire-wound apertures, a plurality of said poles presenting a closed periphery of the stator; that is facing the magnets on the rotor.

The apertures are pre-wound when the salient poles are still mechanically apart from each other.

After mechanical assembly of the poles into a stator, all said wound windings are connected together in series, parallel or series-parallel, and are terminated in two free coil ends.

The description and illustrations that are shown are by no means conclusive.

A person skilled in the art could easily make modifications, additions and alterations.

BRIEF DESCRIPTION OF THE DRAWINGS

FIG. 1 is a schematic of the AC drive circuit showing components, AC terminals and the coils two free ends.

FIG. 2 is showing acceleration sequences A, B, C, and D. and related reference x.

FIG. 7 is showing a partial section of a internal rotor motor/generator with the congruous stator's internal periphery facing the internal magnets. A six pole is shown.

FIG. 8 is showing a partial section of an external rotor motor/generator with the congruous stator's external periphery facing the inside of the external magnets. A six pole is shown.

FIG. 9 is showing a 4 transistor circuit that can be used in the different embodiments.

FIG. 10 is showing how the mushroom-shaped stator poles is nested for economy.

Figure 3:
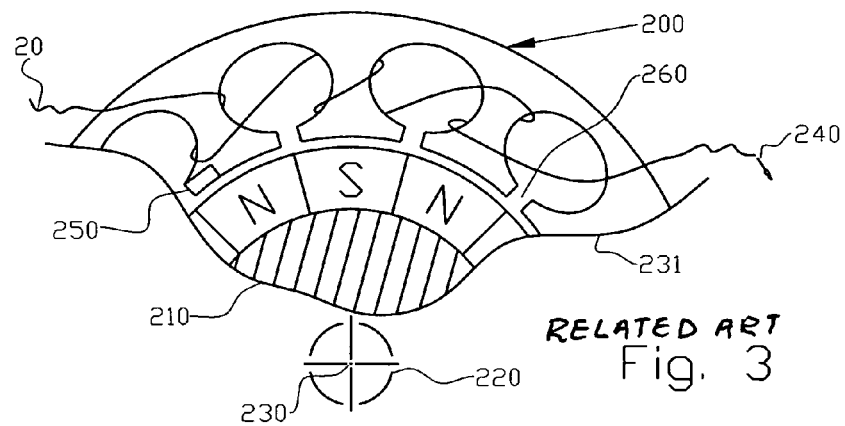
FIG. 3 is RELATED ART showing a partial section of rotor and stator poles of an internal machine with gaps for winding, that is causing cogging

DETAILED DESCRIPTION OF THE DRAWINGS.

FIG. 1 is a schematic of the present inventions AC drive circuit 10 showing components, AC input terminals and the coils two free ends. A first AC input connector 15 is connected to the coils first free end 20. Its second free end 25 in turn is connected to an input terminal 30 of the first switch 35. Switch 35 has an output terminal 40 that has four connections: (1) A diode 45 connected across terminal 30 and 40; (2) a diode 50 connected to the second AC input 55, (3) connected to the output terminal 60 of second switch 65, (4) a signal ground line 41 to pin 4 on sensor 120, ground connection for capacitor 125 and ground connection for transistor 100.

The input terminal 70 of second switch 65 is also connected to second AC input 55. A voltage dropping resistor 75 is connected to point 20 and its other end is connected a diode 80 with an output lead connected to pin 1 on sensor 120 and also to a resistor 85 connected to the input end 90 of inverter transistor 100, that also has a base-lead 105 that is connected to a current sense resistor 110 that has connection at point 25. Input end 90 of transistor 100 is also connected to gate lead 115 of the triac 130 that is used as a switch-in device and is also the circuits third electronic switch.

Triac 130 has its input lead connected to point 25 and its output connected to second AC input line 55. The sensor's 120 pin 1 has one resistor 135 connected to its pin 2. This pin 2 also has a resistor 140 connected to a gate terminal 145 on the second switch 65. The sensor's 120 pin 1 also has one resistor 146 connected to sensor pin 3. This pin 3 also has a resistor 150 connected to a gate terminal 155 on the first switch 35.

A sensor with one output can also be used,; requiring an inverter transistor to give two outputs (not shown). Point 55 is also the main connection point to second input connection of AC.

FIG. 2 is showing acceleration sequences A, B, C, and D. and related time reference X. "A" is an early acceleration sequence showing three positive and three negative half-phases driving and accelerating the motor up towards speed. During acceleration in "B" back-EMF is also occurring in the winding shown as a distorted wave in B. The amount and wave-shape of the back-EMF depends on inductance and resistance of the coil. At "C" the rotor has reached synchronous speed when one positive and one negative half-phase has become a re-constituted full wave. Shown in "D" is the smooth AC wave after switch-in of regular AC and the motor is running at synchronous speed.

A representative time period (X) is shown at "D". If the AC driving frequency is 60 hertz this time period would 8.3 milli-seconds.

FIG. 3 is showing a partial section 200 of a Related Art stator that has attraction between magnet poles and stator poles that is creating cogging. Three rotor magnets marked North, South and North are attached to rotor 210 that has a shaft 220 journaled at point 230. These three magnet poles are attracted to the main area of the stator and less attraction to the stator gaps 260, which cause reluctance cogging. A first free end 20 of the stator winding is shown alternately wound (with small diameter wire) on external three stator poles 231 and then continuing 240 to be wound on remaining stator poles and exiting as free end 25 (not shown). A rotor positioning sensor 250 is shown in close relation to the rotor 210 and its magnets. FIG. 3. is showing a brushless permanent magnet motor with an internal rotor construction.

Figure 4:
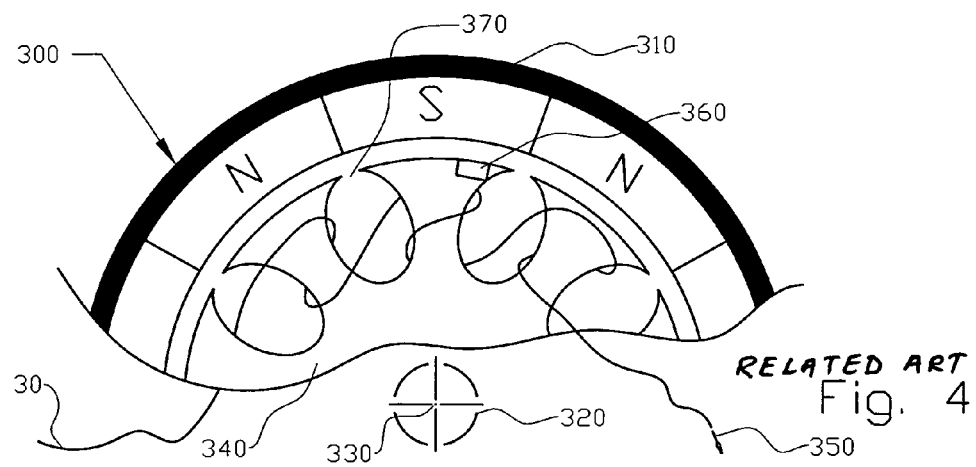
FIG. 4 is RELATED ART showing a partial section of rotor and stator poles of an external rotor machine with gaps for winding, that is causing cogging In FIG. 5 is shown a possible coupling to the rotors output shaft having two plates.

FIG. 4 is showing a partial section 300 of another version a Related Art stator that has attraction between magnet poles and stator poles that is creating cogging Three rotor magnets marked North, South and North are attached to external rotor drum 310 that has a shaft 320 journaled at point 330. Said rotor drum/magnets 310 is the rotating part. These three magnet poles are attracted to the main area of the stator and less attraction to the stator gaps 370, which cause reluctance cogging.

A first free end 30 of the stator winding (with small diameter wire) is shown alternately wound around three internal stator poles 340 and then continuing 350 to be wound on remaining stator poles and exiting as free end 35 (not shown), becoming a brushless motor with external rotor 310, but having the same cogging problem described above. A rotor positioning sensor shown at 360 is shown in close relation to the rotor 310 and its magnets.

Figure 5:
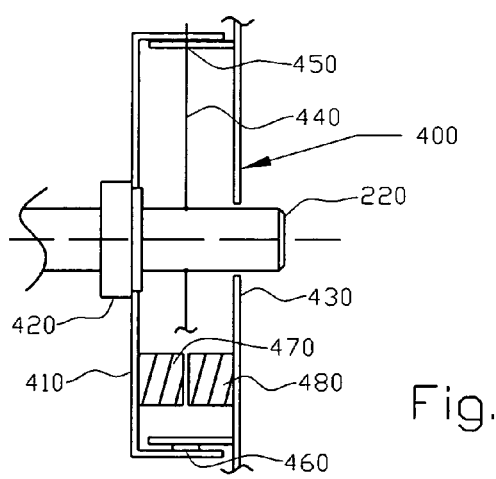

In FIG. 5 is shown a possible coupling 400 with one cup-shaped plate 410 attached at 420 to the motors output shaft 220 (or output shaft 320). Co-axially journaled in close relation to plate 410 is a second plate 430. In between plate 410 and 430 is a spring member 440 attached to the output shaft. Said spring member 440 is engaged in slots 450 in plates 410 and 430 to have torsional freedom to rotate within a small angle. Plates 410 and 430 can have a gel 460 at joint of plate 410 and 430 to dampen torsional vibration. As an alternate structure between the plates 410 and 430 could be mounted one magnet assembly 470 and 480 to in effect make a flexible magnetic coupling.

Figure 6:
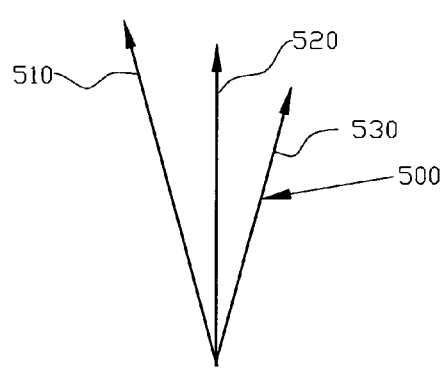
In FIG. 6 is shown a possible vector diagram.

In FIG. 6 is shown a possible vector diagram 500 that could be representative of one type of winding with line volts 510, line amps 520 and winding phase angle 530

FIG. 7 is showing a partial section of an internal rotor motor/generator 700 with the congruous stator's internal periphery 710 facing the outside of the internal magnets, on the rotor 720. A representative windings 730 is shown on one of the congruous stator segments 740 and another representative windings 750 is shown wound on a bobbin 760 assembled onto a congruous stator segments 770 that is split 780 in two parts to allow for bobbin wind. A possible non-congruent small spacing is shown at 784. A rotor position sensor is shown at 785. One of the free ends of the winding is shown at 790, and a bearing at 786.

FIG. 8 is showing a partial section of an external rotor motor/generator 800 with the congruous stator's external periphery 810 facing the inside of the external magnets, on the rotor 820. A representative windings 830 is shown on one of the congruous stator segments 840 and another representative windings 850 is shown wound on a bobbin 860 assembled onto a congruous stator segments 870 that is split 880 in two parts to allow for bobbin wind. A possible non-congruent small spacing is shown at 884. A rotor position sensor is shown at 885. One of the free ends of the winding is shown at 890, and a bearing at 886.

FIG. 9 is showing a a 4 devise electronic circuit, called an H-bridge, 900 that can be used to drive the above described inventions two free ends 910 and 920 respectively. 4 electronic switches 930, 940, 950, and 960 is alternately applying positive/negative pulses to the two free ends.

FIG. 10 is showing how a number of mushroom-shaped congruous poles 1000 can be nested, during the manufacturing process, to save raw material.

The stated illustrations, circuit and the mechanical specifications are by no means conclusive; alternate design is quite possible. A person skilled in the art can make alterations of the specification without altering the scope of the invention.

The invention claimed is:

1. A circuit for a brushless machine having an external rotor, with low cogging, comprising: a circuit for a brushless machine, with low cogging, having like numbers of external rotor permanent magnet poles and mushroom-shaped internal stator poles, each having dual wire-wound rectangular apertures, with a plurality of said stator poles con-joined to have a congruent periphery facing said external magnet poles that are concentrically journaled in close relationship with said stator pole, said wire-windings of all said stator poles connected together to be terminated into two free coil ends supplying electric generated smooth AC sine-wave power when said rotor poles are rotationally driven, and having a commutating drive circuit energizing said two free coil ends when used as a motor.

2. A machine as defined in claim 1 wherein each said wound pole is an angular segment related to total number of the dynamos poles: 2-pole=180 degrees, 4-pole=90 degrees, 6-pole=60 degrees, 8-pole=45 degrees, 12-pole=30 degrees, and so forth, wherein said segments are congruously secured on a mounting plate, and each segment is replaceable.

3. A machine as defined in claim 1 wherein said wire windings are connected together either in series, parallel or series-parallel and its ultimate termination is in two free coil ends.

4. A machine as defined in claim 1 wherein each magnet pole is having closely spaced permanent magnet of one polarity.

5. The commutated circuit described in claim 1 wherein said drive circuit are having switches which are selected from one or more of the following: MOSFET, Transistor, IGBT, SCR, or Triac.

6. The circuit described in claim 1 wherein said permanent magnet material is selected from: ferrite, neodymium-iron-boron, alnico, samarium-cobalt.

7. The circuit described in claim 1 wherein said two free ends are paralleled with an auxiliary winding shown as 730 and 750 wherein said auxiliary winding is having from 1 to 45 degree mechanical off-set from said two free ends.

8. The circuit described in claim 1 wherein said mushroom-shaped stator poles are having rectangular apertures for winding of said wire winding, ultimately terminating as two free ends.

9. a circuit for a brushless machine having an internal rotor, with low cogging, comprising:
a circuit for a brushless machine, with low cogging, having like numbers of internal rotor magnet poles and mushroom-shaped external stator poles, each having dual wire-wound rectangular apertures, with a plurality of said stator poles con-joined with fastening means to have a congruent internal diameter facing said internal magnet poles that are concentrically journaled in close relationship with said stator poles, said wire-windings of all said stator poles connected together to be ultimately terminated into two free ends, supplying electric generated smooth sine-wave AC power when said rotor poles are rotationally driven, and having a commutating drive circuit energizing said two free coil ends when used as a motor.

10. The circuit described in claim 9 wherein said two free ends are paralleled with an auxiliary winding wherein said auxiliary winding is having from 1 to 45 degree mechanical off-set.

11. The circuit described in claim 9 wherein a rotor position sensor is mechanically off-set from the neutral axis between two of said stator poles.

12. The circuit described in claim 9 wherein a rotor position sensor is replaced by a microcontroller sending said signals for controlling the timing and said energizing, achieving sensor-less operation.

13. The commutated circuit described in claim 9 wherein said energizing/timing of coils are having substantially 100 percent of coils energized at any one time, and said coils are co-acting with all of said permanent magnets at any one time.

14. The circuit in claim 13 wherein a rotor position sensor sends signals for controlling the timing of said energizing.

15. The circuit described in claim 14 wherein the position sensor has an inherent locked rotor protection.

16. The circuit described in claim 13 wherein said timing is controlled by a micro-controller.

17. The circuit described in claim 13 wherein said microcontroller also monitors and corrects both the power input and motor load occurring as current at said two free ends, to optimize efficiency and starting.

18. The circuit described in claim 9 wherein said two free ends are paralleled with an auxiliary winding shown as 830 and 850 wherein said auxiliary winding is having from 1 to 45 degree mechanical off-set from said two free ends.

19. The circuit described in claim 9 wherein said mushroom-shaped stator poles are having rectangular apertures for winding of said wire winding, ultimately terminating as two free ends.

20. A drive circuit for a brushless machine, with low cogging, comprising:

A circuit for a brushless machine, with low cogging, having a rotor with permanent magnet poles journaled in a stator having a like number of poles, conjoined to have a congruent periphery facing said magnet poles, with stator poles having alternately wound coils coupled to form a single coil with two free ends, said two free ends alternately energized with sine wave pulses to start and accelerate said rotor into synchronism with said sine wave, following said synchronism a switch connects said two free ends to AC, wherein a rotor shaft is having an attached first cup-shaped circular plate, a secondary cup-shaped circular plate co-axially journaled with the first, said secondary plate serving as a torque output plate, a spring member attached to said shaft engaging slots in both said plates, giving torsional flexibility between both said plates and said shaft, and wherein a void between said two plates is filled with a viscous material or gel.

21. The circuit described in claim 20 wherein at least one of said plates is having attached magnets, and said two plates are co-acting through magnetic coupling.

* * * * *